(12) United States Patent
Jarett

(10) Patent No.: US 10,749,600 B2
(45) Date of Patent: Aug. 18, 2020

(54) SYSTEMS AND METHODS FOR SINGLE OPTICAL FIBER DATA TRANSMISSION

(71) Applicant: THE BOEING COMPANY, Chicago, IL (US)

(72) Inventor: Keith Jarett, Lafayette, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/951,335

(22) Filed: Apr. 12, 2018

(65) Prior Publication Data

US 2019/0319707 A1  Oct. 17, 2019

(51) Int. Cl.
  *H04B 10/00* (2013.01)
  *H04B 10/2575* (2013.01)
  *H04B 10/516* (2013.01)
  *H04B 10/69* (2013.01)
  *G02F 1/21* (2006.01)

(52) U.S. Cl.
  CPC ....... *H04B 10/2575* (2013.01); *H04B 10/516* (2013.01); *H04B 10/691* (2013.01); *G02F 1/21* (2013.01); *G02F 2001/212* (2013.01)

(58) Field of Classification Search
  CPC .................................................. H04B 10/2575
  See application file for complete search history.

(56) References Cited

U.S. PATENT DOCUMENTS

| 6,016,371 A * | 1/2000 | Wickham | G02B 6/2861 385/10 |
|---|---|---|---|
| 8,618,966 B2 | 12/2013 | Kanter et al. | |
| 8,971,671 B2 * | 3/2015 | DeSalvo | H03H 2/003 359/237 |
| 9,356,704 B1 | 5/2016 | Zanoni et al. | |
| 9,490,899 B1 | 11/2016 | Nguyen et al. | |
| 2003/0198424 A1 * | 10/2003 | Bennett | G01C 19/721 385/12 |
| 2004/0081470 A1 * | 4/2004 | Griffin | H04B 10/5561 398/188 |

(Continued)

OTHER PUBLICATIONS

Shalabh Gupta, Demonstration of Distortion Suppression in Photonic Time-Stretch ADC using Back Propagation Method, Nov. 2007, IEEE Xplore, All Pages.*

(Continued)

*Primary Examiner* — David C Payne
*Assistant Examiner* — Pranesh K Barua
(74) *Attorney, Agent, or Firm* — Armstrong Teasdale LLP

(57) ABSTRACT

Optical transmission systems and methods are provided herein. The system includes a modulator configured to impress an input radio frequency (RF) signal onto an input optical signal to generate a first modulated optical signal and a second modulated optical signal. The system also includes a signal adjustment controller configured to apply a delay to the first modulated optical signal or the second modulated optical signal, interleave the first modulated optical signal and the second modulated optical signal, and transmit the interleaved first and second modulated optical signals as one optical signal. The system also includes a single optical link coupled to the modulator and configured to carry the interleaved first and second modulated optical signals to a receiver.

20 Claims, 3 Drawing Sheets

(56) References Cited

U.S. PATENT DOCUMENTS

| | | | | |
|---|---|---|---|---|
| 2007/0041735 | A1* | 2/2007 | Darcie | H04B 10/032 398/186 |
| 2008/0124090 | A1* | 5/2008 | Webb | H04B 10/2537 398/140 |
| 2008/0253768 | A1* | 10/2008 | Yu | H04B 10/5165 398/51 |
| 2009/0103927 | A1* | 4/2009 | Cunningham | H04B 10/6971 398/139 |
| 2010/0046952 | A1* | 2/2010 | DeSalvo | H04B 10/2575 398/115 |
| 2010/0067607 | A1* | 3/2010 | Westlund | H04B 10/677 375/283 |
| 2010/0201345 | A1* | 8/2010 | Gupta | G02F 7/00 324/96 |
| 2010/0266289 | A1* | 10/2010 | Devgan | H04B 1/18 398/147 |
| 2013/0028552 | A1* | 1/2013 | DeSalvo | H03H 2/003 385/2 |
| 2013/0028603 | A1* | 1/2013 | Chien | H04B 10/5051 398/65 |
| 2013/0071122 | A1* | 3/2013 | Sasaki | H04B 10/66 398/79 |
| 2013/0183041 | A1* | 7/2013 | Wan | H04B 1/28 398/81 |
| 2014/0241717 | A1* | 8/2014 | Cvijetic | H04Q 11/0067 398/48 |
| 2014/0270807 | A1* | 9/2014 | Hutchinson | H04B 10/532 398/184 |
| 2014/0286642 | A1* | 9/2014 | Lowery | H04B 10/616 398/115 |
| 2019/0064556 | A1* | 2/2019 | Burke | G02F 1/0123 |

OTHER PUBLICATIONS

Chi Lee, "Microwave Photonics", Mar. 21, 2013, CRC Press, p. 395.*

Esman, D. et al., Highly Linear Broadband Photonic-Assisted Q-Band ADC, Journal of Lightwave Technology, Jun. 1, 2015, pp. 2256-2262, vol. 33, No. 11.

Datta, K. et al., All Optical Reversible Multiplexer Design using Mach-Zehnder Interferometer, 27th International Conference on VLSI Design and 13th International Conference on Embedded ystems, IEEE Computer Society, 2014, pp. 539-544.

Fujisawa, T. et al., Low-Loss Cascaded Mach-Zehnder Multiplexer Integrated 25-Gbit/s x 4-Lane EADFB Laser Array for Future CFP4 100 GbE Transmitter, IEEE Journal of Quantum Electronics, Dec. 2013, pp. 1001-1007, vol. 49, No. 12.

* cited by examiner

SYSTEMS AND METHODS FOR SINGLE OPTICAL FIBER DATA TRANSMISSION

BACKGROUND

The field of the invention relates generally to optical communication, and more particularly, to systems and methods for optical data transmission over a single fiber or a single free space link.

At least some known radio frequency (RF) photonic designs have been devised that enable high-frequency wideband analog to digital (A/D) conversion using a pulsed laser source as an optical carrier. Under-sampling may be used to affect down-conversion of a band-limited RF signal. Combining these aspects yields an RF photonic microwave to digital converter (MDC). Laser relative intensity noise (RIN) can be reduced by cancellation when a dual-output Mach-Zender modulator (MZM) is used and both outputs are delay matched prior to sampling.

Delay matching the two paths from the MZM to a detector is challenging, especially when the paths are long, such as for a link from a receiving antenna to a remotely located receiver. Equal length transmission lines may not be feasible due to physical obstructions and thermal differences.

SUMMARY

In one aspect, an optical transmission system and is provided. The system includes a modulator configured to impress an input radio frequency (RF) signal onto an input optical signal to generate a first modulated optical signal and a second modulated optical signal. The system also includes a signal adjustment controller configured to apply a delay to the first modulated optical signal or the second modulated optical signal, interleave the first modulated optical signal and the second modulated optical signal, and transmit the interleaved first and second modulated optical signals as one optical signal. The system also includes a single optical link coupled to the modulator and configured to carry the interleaved first and second modulated optical signals to a receiver.

In another aspect, a method is provided. The method includes generating, by a modulator, from an input radio frequency (RF) signal and an input optical signal, a first modulated optical signal and a second modulated optical signal, applying, by a signal adjustment controller, a delay to the first modulated optical signal or the second modulated optical signal, interleaving, by the signal adjustment controller, the first modulated optical signal and the second modulated optical signal, transmitting, by the signal adjustment controller, the interleaved first and second modulated optical signals as one optical signal, and carrying, by a single optical link coupled to the modulator, the interleaved first and second modulated optical signals to a receiver.

DETAILED DESCRIPTION

Figure 1:
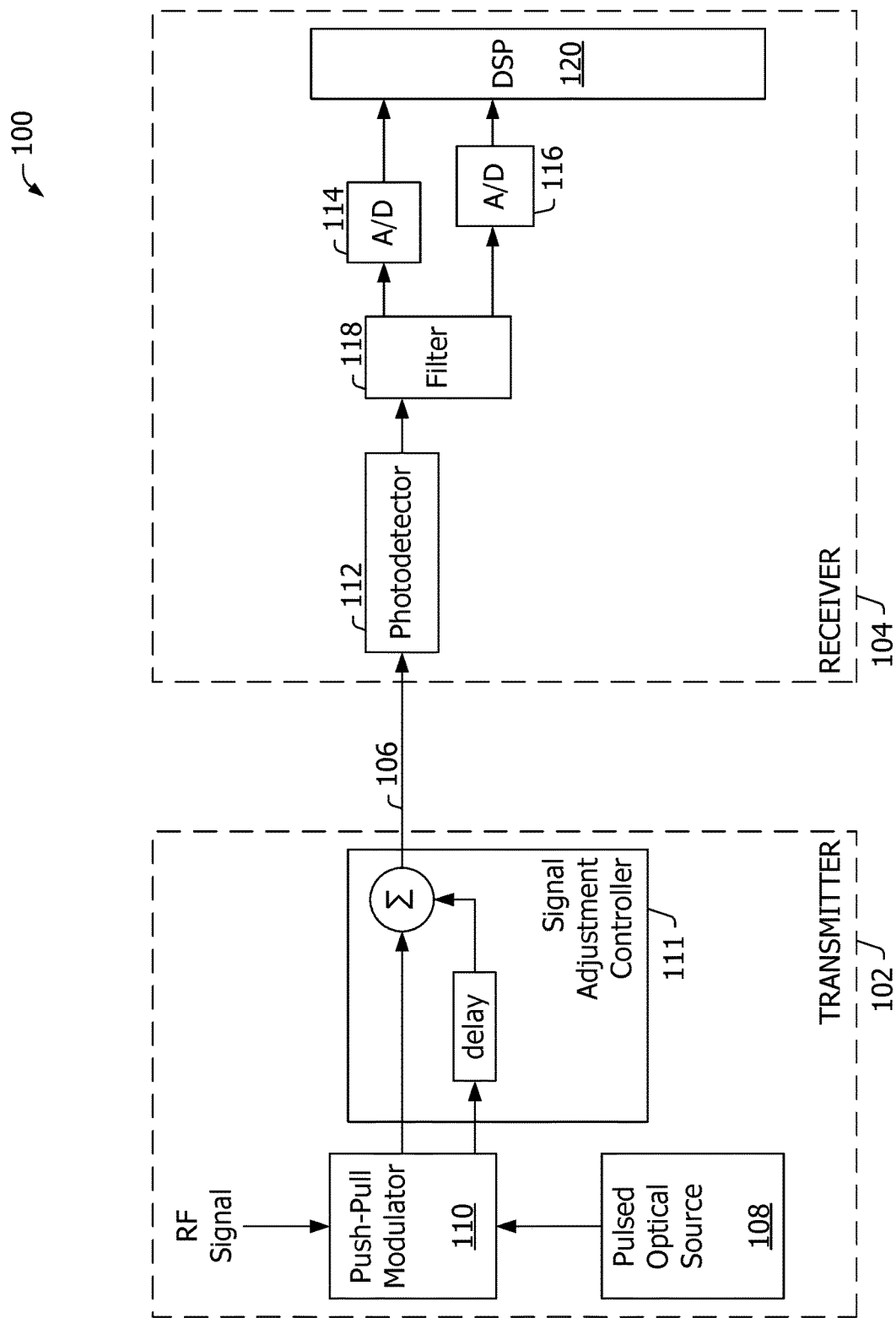
FIG. 1 is a block diagram of an exemplary optical transmission system.

FIG. 1 is a block diagram of an exemplary optical transmission system 100. In the exemplary implementation, optical transmission system 100 includes a transmitter 102 coupled to a receiver 104 by an optical link 106. Optical link 106 may include a single optical fiber or a free space optical link. Transmitter 102 includes a pulse source 108, a modulator 110, and a signal adjustment controller 111. Receiver 104 includes a photodetector 112, a first analog-to-digital (A/D) converter 114 and a second A/D converter 116. Optical transmission system 100 may be used in a wide variety of applications, including, but not limited to, in telecommunications for transmitting and receiving purposes, in vehicles such as aircraft and submarines as wiring, and/or in medical fields as light guides, imaging tools and also as lasers for surgeries.

Pulse source 108 is a pulsed optical laser. Pulse source 108 is switched on for a very short duty cycle (e.g., picosecond pulses) and generates a pulse train that is transmitted to modulator 110. In the exemplary implementation, the pulse train is generated at a frequency between 1 kHz and 50 GHz. In one implementation, the pulse train is generated at a frequency of about 10 GHz. However, in alternative implementations, the pulse train may generated at any frequency that enables pulse source 108 to function as described herein.

In the exemplary implementation, modulator 110 is an optical modulator operable to modulate a beam of light. More specifically, in the exemplary implementation, modulator 110 is a dual-output Mach-Zender modulator (MZM); however, modulator 110 may be any other known type of modulator that enables modulator 110 to function as described herein. In the exemplary implementation, a single modulator 110 is used. However, in alternative implementations, two or more modulators 110 may be used. Pulse sources and modulators similar to pulse source 108 and modulator 110 are well-known in the art, so they will not be described in further detail herein.

Modulator 110 is configured to impress, or modulate, an input RF signal onto an input optical pulse source 108, generating first and second complementary modulated optical signals. Each pulse is modified by an RF signal voltage that is present at that instant in the pulse. Each output of modulator 110 includes a train of optical pulses in which the pulse duration is much shorter than the time between pulses. Additionally, the two outputs produce pulses at essentially the same time and are synchronous, as they have the same optical source.

A signal adjustment controller 111 is configured to receive the first and second modulated optical signals and apply a delay to the first modulated optical signal or the second modulated optical signal (the second modulated optical signal in the exemplary implementation). By applying the delay to the second modulated optical signal and combining the two outputs using time multiplexing, signal adjustment controller 111 interleaves, in time, the pulses from the second modulated optical signal between the pulses from the first modulated optical signal. Signal adjustment controller 111 then transmits the interleaved first and second modulated optical signals as one, time multiplexed, optical signal onto the single optical link 106. In alternative implementations, signal adjustment controller 111 may apply the delay to the first modulated optical signal rather than the second modulated optical signal.

Figure 2:
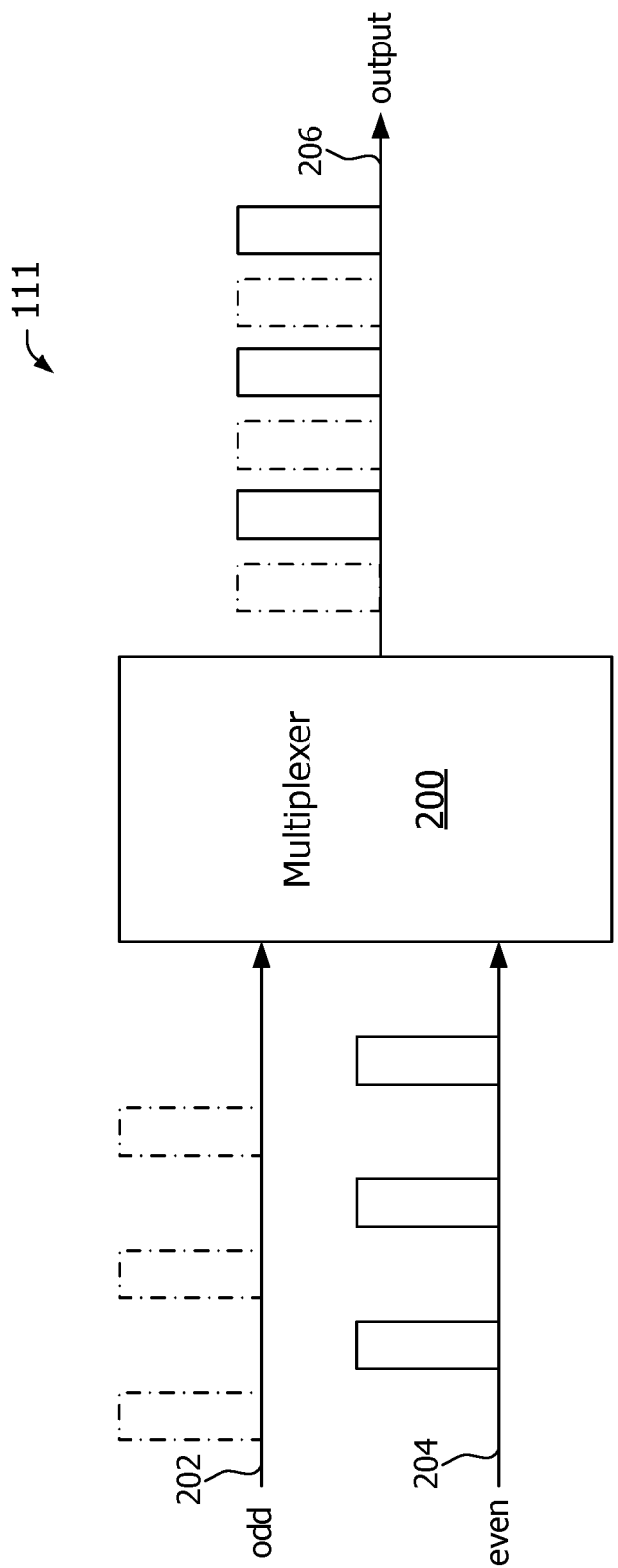
FIG. 2 is a functional block diagram of the signal adjustment controller performing the interleaving of the first and second modulated optical signals shown in FIG. 1.

FIG. 2 is a functional block diagram of signal adjustment controller 111 interleaving the first and second modulated optical signals shown in FIG. 1. In the exemplary embodiment, signal adjustment controller 111 performs one or more operations described herein using a length of optical fiber with or without some means of varying the delay induced by the fiber. Such means may include, for example, physical stretching of the fiber or heating of the fiber. In the exemplary embodiment, signal adjustment controller 111 applies a delay approximately equal to half the pulse repetition period to the second modulated optical signal and interleaves the first modulated optical signal and the second modulated optical signal. That is, signal adjustment controller 111 implements a multiplexer 200. Multiplexer 200 receives the first modulated optical signal, which is associated with odd channels 202, and the second modulated optical signal, which is associated with even channels 204. Multiplexer 200 combines, by summation, the first and second modulated optical signals into a composite signal stream 206 in an interleaved fashion such that the second modulated optical signal is added in between each pulse of the first modulated optical signal. For example, multiplexer 200 may take two multiplexed signals with 100 GHz spacing and interleave them, creating a denser signal with channels at 50 GHz spacing.

The interleaved pulse train is received at receiver 104. Receiver 104 includes a single photodetector 112 configured to convert the interleaved pulse train to an RF signal. In the exemplary implementation, photodetector 112 is a photodiode manufactured using Indium gallium arsenide or the like. In some implementations, photodetector 112 may include two or more photo detectors.

The RF signal is passed through a low-pass filter 118, passing only predetermined frequencies. First and second A/D converters 114, 116 sample the RF signal at two different phases at the same rate as the laser pulses to de-interleave the RF signal into two digital signals. Alternatively, a single A/D converter may be used and the two halves of the signal are separated using digital signal processing.

Receiver 104 further includes a digital signal processor (DSP) 120 for controlling receiver 104. DSP 120 implements a control loop to maintain proper sampling times for the interleaved pulse trains by first and second A/D converters 114, 116. This control loop is simple to implement because the two sampling phases maintain a very nearly constant separation.

DSP 120 is also operable to processes the two sampled outputs to cancel relative intensity noise.

Figure 3:
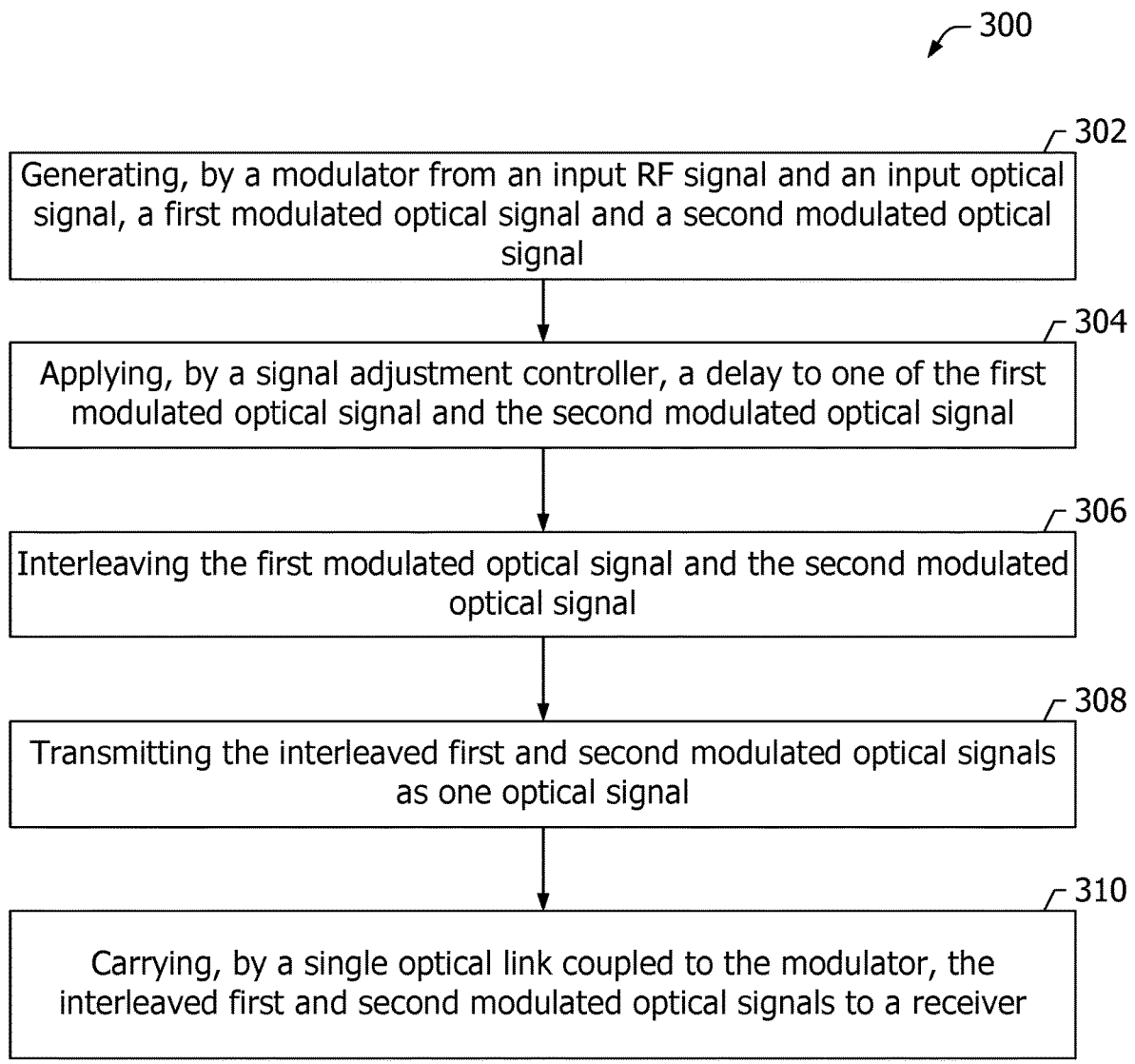
FIG. 3 is a flowchart showing an exemplary method of data transmission over a single optical fiber.

FIG. 3 is a flowchart showing an exemplary method 300 of data transmission over a single optical link. Method 300 includes generating 302, by a modulator, from an input RF signal and an input optical signal, a first modulated optical signal and a second modulated optical signal. Method 300 also includes applying 304, by a signal adjustment controller, a delay to the first modulated optical signal or the second modulated optical signal. The signal adjustment controller interleaves 306 the first modulated optical signal and the second modulated optical signal and transmits 308 the interleaved first and second modulated optical signals as one optical signal. Method 300 further includes carrying 310, by a single optical link coupled to the modulator, the interleaved first and second modulated optical signals to a receiver.

In one embodiment, the receiver is configured to subtract the interleaved second modulated optical signal from the first modulated optical signal to achieve balanced detection.

In one embodiment, method 300 includes receiving and converting, by a photodetector of the receiver, the received interleaved first and second modulated optical signals from the single optical link to a radio frequency (RF) signal, and de-interleaving, by at least one analog-to-digital (A/D) converter of the receiver, the RF signal.

In one embodiment, the at least one A/D converter includes first and second A/D converters, wherein de-interleaving the RF signal includes, sampling, by the first and second A/D converters, the RF signal at first and second phases, respectively, to generate respective first and second digital signals.

In one embodiment, the receiver further includes a digital signal processor (DSP), method 300 further includes cancelling, by the DSP, relative intensive noise from the first and second digital signals.

In one embodiment, method 300 further includes transmitting the input optical input signal to the modulator.

Exemplary embodiments of systems and methods for single optical fiber data transmission are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) producing, by a modulator, from an input RF signal and an input optical signal, a first modulated optical signal and a second modulated optical signal; (b) applying, by a signal adjustment controller, a delay to the first modulated optical signal or the second modulated optical signal; (c) interleaving, by the signal adjustment controller, the first modulated optical signal and the second modulated optical signal; (d) transmitting, by the signal adjustment controller, the interleaved first and second modulated optical signals as one optical signal; and (e) carrying, by a single optical link coupled to the modulator, the interleaved first and second signals to a receiver.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

The order of execution or performance of the operations in the embodiments of the invention illustrated and described herein is not essential unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a modulator configured to impress an input radio frequency (RF) signal onto an input optical signal to generate a first modulated optical signal and a second modulated optical signal, the first modulated optical signal having a first period and the second modulated optical signal having a second period equal to the first period;
    a signal adjustment controller comprising an optical fiber through which the first modulated optical signal propagates, and at least one of a fiber stretcher or a heating element coupled to said optical fiber, said signal adjustment controller configured to:
        tune said fiber stretcher or said heating element to adjust a variable delay to equal half of the first period of the first modulated optical signal;
        apply, by said optical fiber, the variable delay to the first modulated optical signal propagating through said optical fiber;
        interleave the first modulated optical signal and the second modulated optical signal into a time-multiplexed optical signal; and
        transmit the time-multiplexed optical signal; and
    a single optical link coupled to said signal adjustment controller and configured to carry the time-multiplexed optical signal to a receiver.

2. The system of claim 1, wherein the receiver is configured to subtract the second modulated optical signal from the first modulated optical signal to achieve balanced detection.

3. The system of claim 1, wherein said modulator comprises a dual-output Mach-Zehnder modulator.

4. The system of claim 1, wherein said single optical link comprises a single optical fiber or a single free space optical link.

5. The system of claim 1, wherein the receiver is located remote from said modulator.

6. The system of claim 1, wherein the receiver comprises:
    a photodetector configured to convert the time-multiplexed optical signal from said single optical link to a RF signal; and
    at least one analog-to-digital (A/D) converter configured to de-interleave the RF signal.

7. The system of claim 6, wherein said at least one A/D converter comprises first and second A/D converters, wherein to de-interleave the RF signal, said first and second A/D converters are configured to sample the RF signal at first and second phases, respectively, to generate respective first and second digital signals.

8. The system of claim 7, further comprising a digital signal processor (DSP) configured to cancel relative intensive noise from the first and second digital signals.

9. The system of claim 6, wherein said photodetector is a single photodetector.

10. The system of claim 6, wherein said photodetector comprises a plurality of photodetectors.

11. The system of claim 1, further comprising a pulse source configured to transmit the input optical signal to said modulator.

12. A method comprising:
    generating, by a modulator, from an input radio frequency (RF) signal and an input optical signal, a first modulated optical signal having a first period and a second modulated optical signal having a second period;
    tuning, by a signal adjustment controller having an optical fiber through which the first modulated optical signal propagates, at least one of a length or a temperature of the optical fiber to adjust a variable delay to equal half of the first period of the first modulated optical signal;
    applying, by the optical fiber, the variable delay to the first modulated optical signal propagating through the optical fiber;
    interleaving, by the signal adjustment controller, the first modulated optical signal and the second modulated optical signal into a time-multiplexed optical signal;
    transmitting, by the signal adjustment controller, the time-multiplexed optical signal; and
    carrying, by a single optical link coupled to the signal adjustment controller, the time-multiplexed optical signal to a receiver.

13. The method of claim 12, further comprising subtracting the second modulated optical signal from the first modulated optical signal to achieve balanced detection.

14. The method of claim 12, wherein the single optical link includes a single optical fiber or a single free space optical link.

15. The method of claim 12, further comprising:
    receiving and converting, by a photodetector of the receiver, the time-multiplexed optical signal from the single optical link to a RF signal; and
    de-interleaving, by at least one analog-to-digital (A/D) converter of the receiver, the RF signal.

16. The method of claim 15, wherein the at least one A/D converter includes first and second A/D converters, wherein de-interleaving the RF signal comprises, sampling, by the first and second A/D converters, the RF signal at first and second phases, respectively, to generate respective first and second digital signals.

17. The method of claim 16, wherein the receiver further includes a digital signal processor (DSP), said method further comprising cancelling, by the DSP, relative intensive noise from the first and second digital signals.

18. The method of claim 12, further comprising transmitting the input optical signal to the modulator.

19. A signal adjustment controller comprising:
    a first optical fiber configured to receive, from a modulator, and propagate a first modulated optical signal;
    a second optical fiber configured to receive, from the modulator, and propagate a second modulated optical signal;
    at least one of a fiber-stretcher or a heating element coupled to said first optical fiber and configured to be tuned to adjust a variable delay, induced by said first optical fiber, to equal half of a first period of the first modulated optical signal;
    applying, by said first optical fiber, the variable delay to the first modulated optical signal propagating through said first optical fiber;
    a summer coupled to said first optical fiber and said second optical fiber and configured to interleave the first modulated optical signal and the second modulated optical signal into a time-multiplexed optical signal; and
    an output optical fiber coupled to said summer and configured to transmit the time-multiplexed optical signal over a single optical link to a receiver.

20. The signal adjustment controller of claim 19, wherein the receiver is configured to subtract the second modulated optical signal from the first modulated optical signal to achieve balanced detection.

* * * * *